United States Patent
Shih et al.

(10) Patent No.: US 8,831,622 B2
(45) Date of Patent: Sep. 9, 2014

(54) METHOD OF CONSTRUCTING SPECTRUM MAP BY USING COMPRESSED SENSING AND RELATED COMMUNICATION DEVICE

(75) Inventors: Sung-Yin Shih, Taoyuan County (TW); Kwang-Cheng Chen, Taoyuan County (TW); Feng-Seng Chu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 368 days.

(21) Appl. No.: 13/334,083

(22) Filed: Dec. 22, 2011

(65) Prior Publication Data

US 2012/0329510 A1 Dec. 27, 2012

Related U.S. Application Data

(60) Provisional application No. 61/426,374, filed on Dec. 22, 2010.

(51) Int. Cl.
| | |
|---|---|
| *H04W 72/00* | (2009.01) |
| *H04B 17/00* | (2006.01) |
| *H04W 24/00* | (2009.01) |
| *H04W 28/06* | (2009.01) |

(52) U.S. Cl.
CPC .............. *H04W 24/00* (2013.01); *H04W 72/00* (2013.01); *H04B 17/0042* (2013.01); *H04B 17/0057* (2013.01); *H04W 28/06* (2013.01)
USPC .......................................... 455/450; 455/509

(58) Field of Classification Search
USPC ..................................... 455/450–452.2, 509
See application file for complete search history.

(56) References Cited

U.S. PATENT DOCUMENTS

| | | |
|---|---|---|
| 6,266,013 B1 | 7/2001 | Stilp |
| 2010/0220687 A1 | 9/2010 | Reznik |
| 2011/0090939 A1 | 4/2011 | Diener |

FOREIGN PATENT DOCUMENTS

CN 101630982 A 1/2010

OTHER PUBLICATIONS

Richard Baraniuk, "Compressive Sensing," Lecture Notes in IEEE Signal Processing Magazine, vol. 24, p. 1-9, Jul. 2007.
David L. Donoho, "Compressed sensing," IEEE Transactions on Information Theory, vol. 52, No. 4, pp. 1289-1306, Apr. 2006.
Office action mailed on Apr. 18, 2012 for the DE application No. 102011121931.9, p. 1-6.

(Continued)

*Primary Examiner* — Raymond Dean
(74) *Attorney, Agent, or Firm* — Winston Hsu; Scott Margo

(57) ABSTRACT

A method comprises receiving power information transmitted by a plurality of mobile devices in a wireless communication system; processing the received power information to be a result of unknown power information multiplied by a measurement matrix relating to positions of the plurality of mobile devices, wherein a number of columns of the measurement matrix is larger than a number of rows of the measurement matrix; generating an amendment matrix satisfying restricted isometry property (RIP), for processing the measurement matrix, and obtaining a modified measurement matrix satisfying the RIP according to the amendment matrix and the measurement matrix; obtaining estimated power information according to the received power information by using $L_1$ norm and the modified measurement matrix; and constructing at least one spectrum map of at least one frequency band according to the estimated power information.

11 Claims, 5 Drawing Sheets

(56) References Cited

OTHER PUBLICATIONS

Harish Ganapathy et al., "Limited Feedback for Cognitive Radio Networks Using Compressed Sensing", Forty-Eighth Annual Allerton Conference Allerton House, UIUC, Illinois, USA, Sep. 29, 2010, pp. 1090-1097, 2010 IEEE.

Office action mailed on Jan. 2, 2014 for the China application No. 201110436377.8, filing date Dec. 22, 2011.

Bin Gu et al., "Cooperative Compressed Sensing for Wide-Band Spectrum Detection with Sequential Measurements", 6th International Conference on Wireless Communications Networking and Mobile Computing (WiCOM), Sep. 23-25, 2010, pp. 1-5.

Office action mailed on Mar. 18, 2014 for the Taiwan application No. 100148078, filing date: Dec. 22, 2011, p. 1-7.

METHOD OF CONSTRUCTING SPECTRUM MAP BY USING COMPRESSED SENSING AND RELATED COMMUNICATION DEVICE

CROSS REFERENCE TO RELATED APPLICATIONS

This application claims the benefit of U.S. Provisional Application No. 61/426,374, filed on Dec. 22, 2010 and entitled "Method for Compressed Sensing Construction of Spectrum Map", the contents of which are incorporated herein in their entirety.

BACKGROUND OF THE INVENTION

1. Field of the Invention

The present invention relates to a method used in a wireless communication system and related communication device, and more particularly, to a method of constructing a spectrum map by using compressed sensing and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicates with a core network including a mobility management entity (MME), a serving gateway, etc., for Non Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (COMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In addition to the advanced techniques mentioned above, the most effective way for improving quality of a received signal is to shorten a distance between a transmitter and a receiver in a wireless communication system. Thus, a heterogeneous network is proposed for introducing multiple layers of cells in the wireless communication system such that the distance between the transmitter and the receiver is shortened.

For example, there are three types of cells and a relay node in the heterogeneous network. According to coverage of the cells, the cells are a macrocell, a picocell and a femtocell from the largest to the smallest. Besides, the macrocell, the picocell and the femtocell are managed by a macro base station (BS) (e.g. eNB), a pico BS and a femto BS, respectively. Different from a convention network including only macrocells, the heterogeneous network not only includes the macrocells, but each of the macrocells could include at least one picocell, at least one femtocell and at least one relay node for improving throughput of UEs in the heterogeneous network. In this situation, a UE in coverage of a macrocell may also be in coverage of a picocell or a femtocell in the macrocell. If the UE is far from a macro BS of the macrocell, the UE can communicate with a pico BS of the picocell or a femto BS of the femtocell with low transmission power to access services such as Internet, TV broadcasting, etc. Even if the UE is not in the coverage of the picocell and the femtocell, the UE may also communicate with the macro BS via a relay node wherein channel quality between the UE and the relay node is better than that between the UE and the macro BS. That is, the relay node serves as a bridge between the UE and the macro BS, and forwards signals between the UE and the macro BS. In other words, the UE and the macro BS do not need to increase their transmission power greatly to communicate with each other. Therefore, power consumption of the UE and the macro BS can be reduced by using the pico BS, the femto BS or the relay node. Furthermore, throughput of the UE is increased since quality of the signals transmitted and received by the UE is improved due to a short distance between the UE and the pico BS, the femto BS or the relay node.

However, even though the power consumption of the UE and the macro BS is reduced, interference in the macrocell is increased since the pico BS and the femto BS may transmit and receive signals at the same time in an overlapped bandwidth and cause the interference to each other. Therefore, the interference should be mitigated or avoided such that the multiple BSs can operate regularly to realize benefit of the heterogeneous network efficiently.

For example, a BS of a cell can allocate radio resources to UEs in the cell according to geographic distribution of power intensity (e.g. signal strength) in the cell, to minimize interference suffered by the UEs. That is, a spectrum map revealing the geographic distribution of the power intensity in the cell should be available at the BS such that the BS can allocate the radio resources to the UEs according to the spectrum map. However, the spectrum map is established based on measurement reports transmitted by the UEs. If high accuracy is required for the spectrum map, sizes of the measurement reports should be large, and overhead caused by the measurement reports is very high. On the other hand, if the measurement reports are undersampled to reduce the overhead before transmitting to the BS, i.e., only part of the measurement reports are transmitted, the BS may not completely recover the measurement reports due to the Nyquist Theorem, i.e., information which is compressed or undersampled too much (e.g. over a certain threshold) can not be completely recovered without distortion. That is, some information of the measurement reports is lost, and distortion is caused to the spectrum map, i.e., accuracy of the spectrum map is low. Besides, when a number of the UEs may not be sufficient and/or positions of the UEs are not uniform enough, the measurement reports can also be seem as being undersampled. In other words, high accuracy of the spectrum map and low overhead caused by the measurement reports are hard to be achieved at the same time, and tradeoff must be made. Therefore, benefit brought from the interference mitigation and the interference avoidance is limited due to the tradeoff, and how to establish the spectrum map with high accuracy and reduced overhead is a topic to be discussed and addressed.

SUMMARY OF THE INVENTION

The present invention therefore provides a method and related communication device for constructing a spectrum map by using compressed sensing to solve the abovementioned problems.

A method of constructing at least one spectrum map of at least one frequency band for a network of a wireless communication system is disclosed. The method comprises receiving power information transmitted by a plurality of mobile devices in the wireless communication system; processing received the power information be a result of unknown sampled power information by using a measurement matrix relating to positions of the plurality of mobile devices, wherein a number of columns of the measurement matrix is larger than a number of rows of the measurement matrix; generating an amendment matrix satisfying restricted isometry property (RIP), for processing the measurement matrix, and obtaining a modified measurement matrix satisfying the RIP according to the amendment matrix and the measurement matrix; obtaining estimated power information according to the received power information by using L1 norm and the modified measurement matrix; and constructing the at least one spectrum map of the at least one frequency band according to the estimated power information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
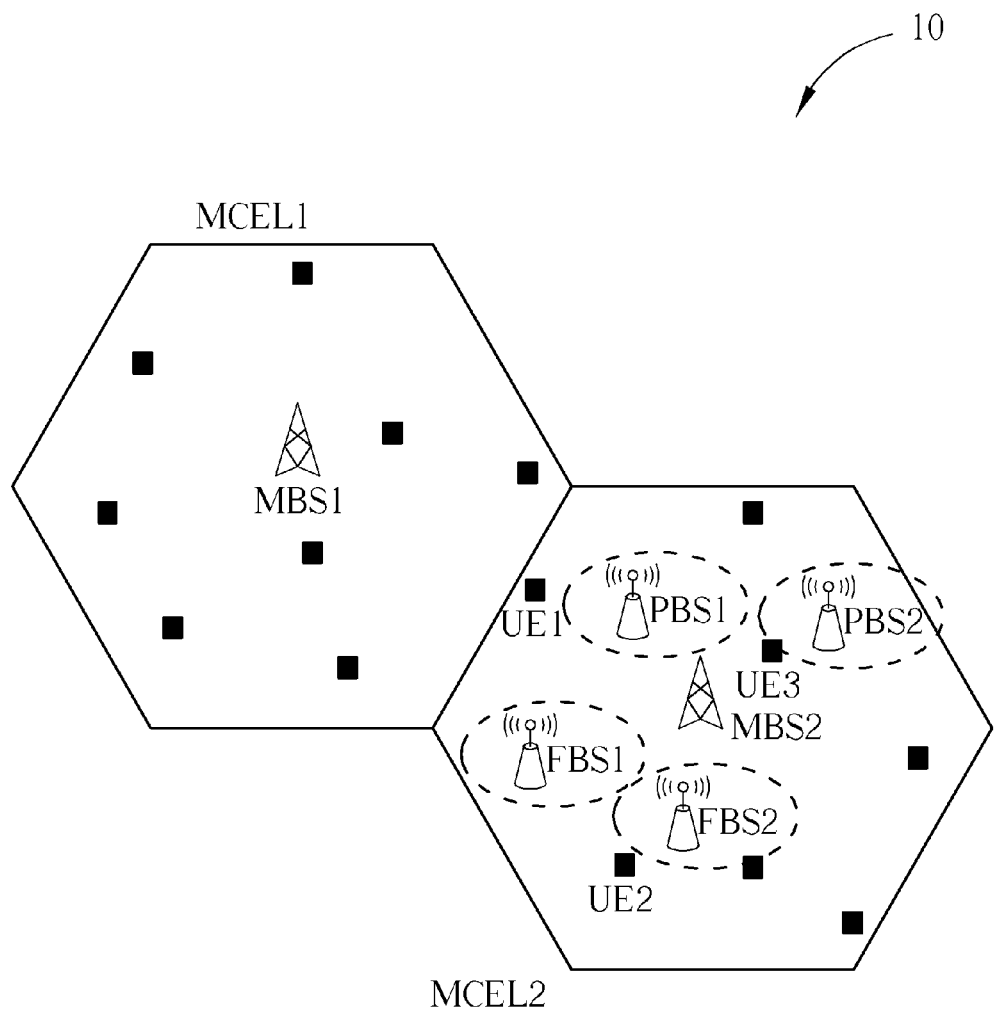
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of 2 macrocells MCEL1-MCEL2. The wireless communication system 10 may be a wideband code division multiple access (WCDMA) system such as a universal mobile telecommunications system (UMTS). Alternatively, the wireless communication system 10 may be an orthogonal frequency-division multiplexing (OFDM) system and/or an orthogonal frequency-division multiple access (OFDMA) system, such as a long term evolution (LTE) system or a LTE-Advanced (LTE-A) system. The macrocells MCEL1-MCEL2 are managed by macro base stations (BSs) MBS1-MBS2, respectively. Further, user equipments (UE) UE1-UE3, femto BSs FBS1-FBS2 of femtocells FCEL1-FCEL2 and pico BSs PBS1-PBS2 of picocells PCEL1-PCEL2 are in the macrocell MCEL2. Besides, other UEs are also represented by black squares, and are not labeled for simplicity. Therefore, the wireless communication system 10 can be seen as a heterogeneous network comprised of multiple layers of cells.

In general, a picocell and a femtocell are deployed at a hot spot, an office, a community, etc. within a macrocell, for enhancing coverage of the macrocell, to provide services with better quality to a UE and to reduce power consumption of the UE and the macro BSs. When the UE is in coverage of the picocell or the femtocell within the macrocell, the UE can communicate with a pico BS of the picocell or a femto BS of the femtocell which is near the UE, for accessing the services without communicating to a macro BS of the macrocell far from the UE.

Please note that, the cells, the BSs and the UEs are simply utilized for illustrating the structure of the wireless communication system 10. Practically, the macro BSs MBS1-MBS2 can be referred as Node-Bs (NBs) in a universal terrestrial radio access network (UTRAN) of the UMTS or evolved NBs (eNBs) in an evolved UTRAN (E-UTRAN) of the LTE system or the LTE-A system, and are not limited herein. The pico BSs PCEL1-PCEL2 and the femto BSs FCEL1-FCEL2 can be the NBs or the eNBs with small coverage or newly developed BSs with all or part of functions of the NBs or the eNBs. The UEs can be mobile devices such as mobile phones, laptops, tablet computers, electronic books, and portable computer systems. Besides, a BS (e.g. a macro BS, a pico BS or a femto BS) and a UE can be seen as a transmitter or a receiver according to transmission direction, e.g., for an uplink (UL), the UE is the transmitter and the BS is the receiver, and for a downlink (DL), the BS is the transmitter and the UE is the receiver.

Figure 2:
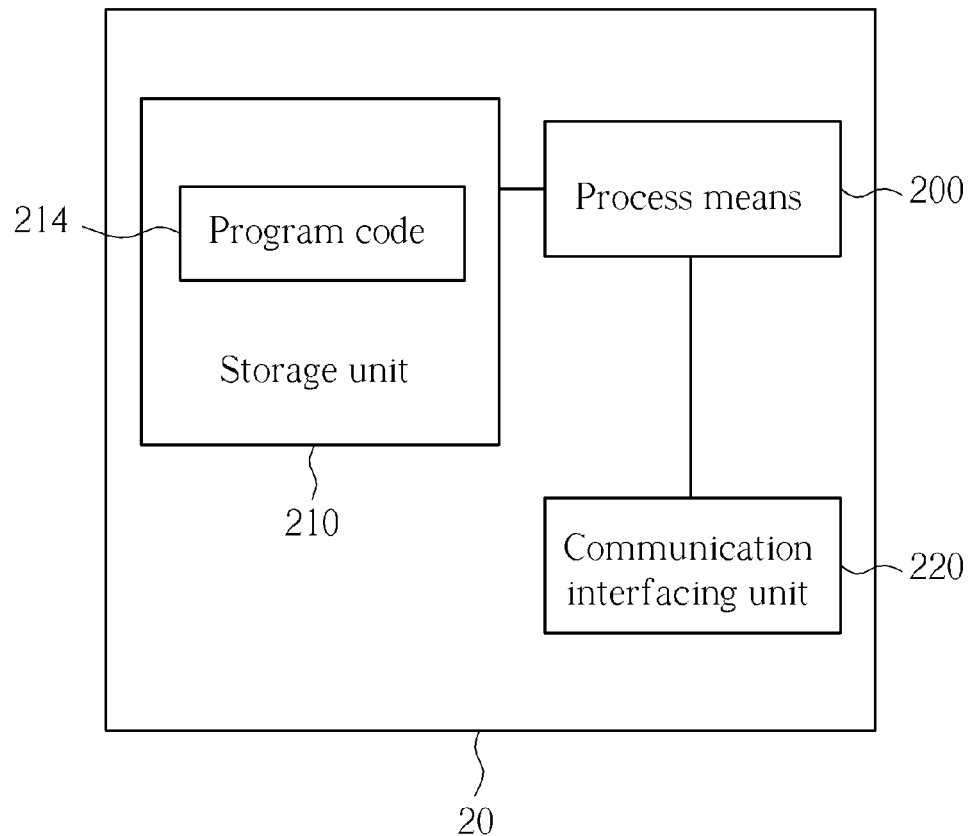
FIG. 2 is a schematic diagram of a communication device according to an example of the present invention.

Please refer to FIG. 2, which is a schematic diagram of a communication device 20 according to an example of the present invention. The communication device 20 can be a UE or a BS shown in FIG. 1, but is not limited herein. The communication device 20 may include a process means 200 such as a microprocessor or an Application Specific Integrated Circuit (ASIC), a storage unit 210 and a communication interfacing unit 220. The storage unit 210 may be any data storage device that can store a program code 214, accessed by the process means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver and can exchange wireless signals with the network according to processing results of the process means 200.

Figure 3:
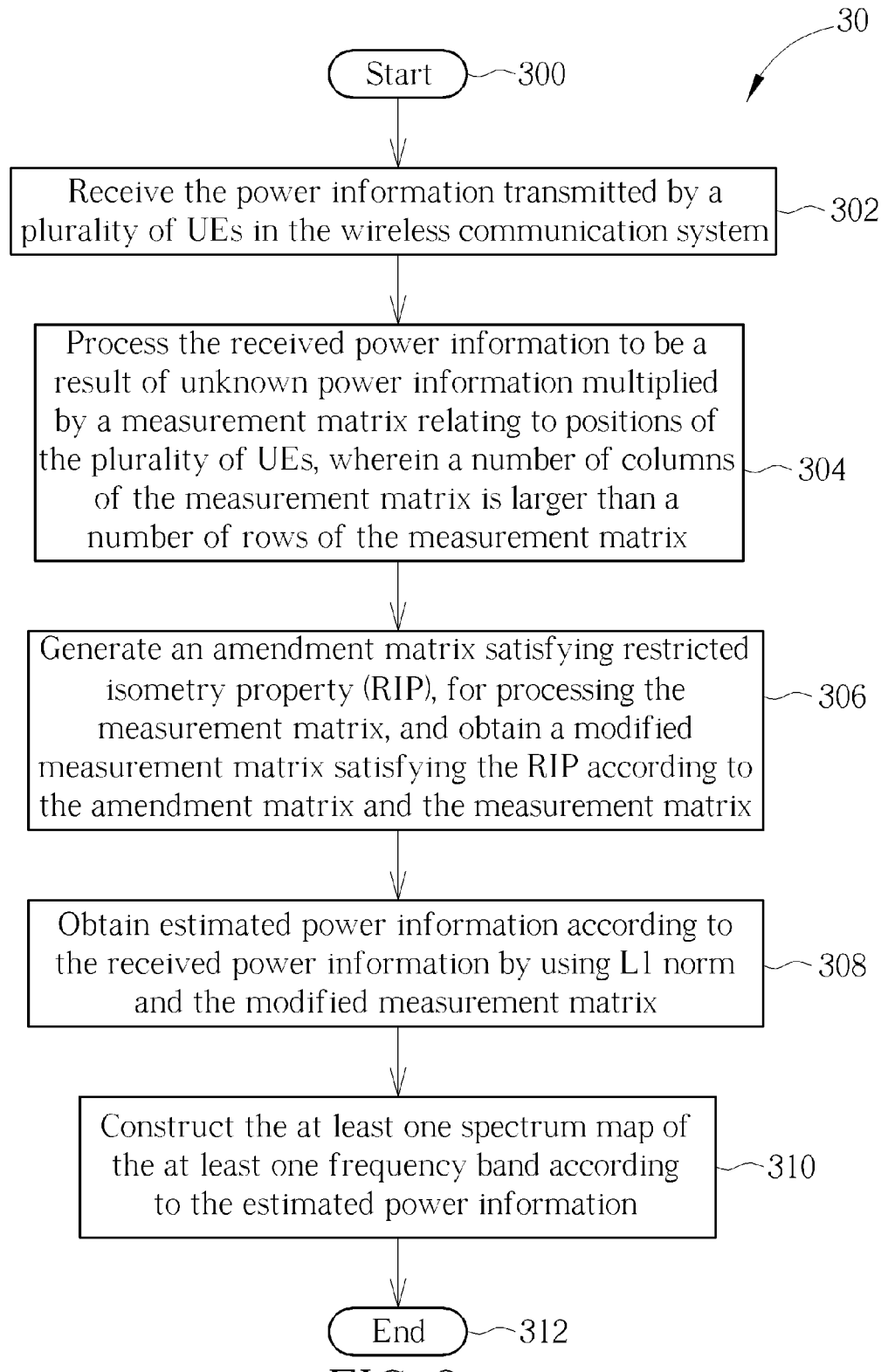
FIG. 3 is a flowchart of a process according to an example of the present invention.

Please refer to FIG. 3, which is a flowchart of a process 30 according to an example of the present invention. The process 30 is utilized in the macro BS MBS2 shown in FIG. 1, for estimating unknown power information (e.g. power intensity) at least one frequency band by using compressed sensing, for constructing at least one spectrum map of the at least one frequency band. The process 30 may be compiled into the program code 214 and includes the following steps:

Step 300: Start.

Step 302: Receive the power information transmitted by a plurality of UEs in the wireless communication system.

Step 304: Process the received power information to be a result of unknown power information multiplied by a measurement matrix relating to positions of the plurality of UEs, wherein a number of columns of the measurement matrix is larger than a number of rows of the measurement matrix.

Step 306: Generate an amendment matrix satisfying restricted isometry property (RIP), for processing the measurement matrix, and obtain a modified measurement matrix satisfying the RIP according to the amendment matrix and the measurement matrix.

Step 308: Obtain estimated power information according to the received power information by using $L_1$ norm and the modified measurement matrix.

Step 310: Construct the at least one spectrum map of the at least one frequency band according to the estimated power information.

Step 312: End.

According to the process 30, after the macro BS MBS2 receives the power information transmitted by the plurality of UEs in the wireless communication system, the macro BS MBS2 processes the received power information to be the result of unknown power information multiplied by the measurement matrix relating to the positions of the plurality of UEs, wherein the number of the columns of the measurement matrix is larger than the number of the rows of the measurement matrix. Besides, the macro BS MBS2 generates the amendment matrix satisfying the RIP, for processing the measurement matrix, and obtains the modified measurement matrix satisfying the RIP according to the amendment matrix and the measurement matrix. Then, the macro BS MBS2 obtains the estimated power information according to the received power information by using the $L_1$ norm and the modified measurement matrix, and can construct the at least one spectrum map of the at least one frequency band according to the estimated power information. Since the positions of the plurality of UEs are random and a number of the plurality of UEs may not be sufficient, the power information received by the macro BS MBS2 is undersampled and distortion is caused to the at least one spectrum map. However, the distortion can be reduced greatly by exploiting the RIP (i.e., the compressed sensing) of the modified measurement matrix. Thus, accuracy of the at least one spectrum map is high without being affected by the undersampling. Further, the process 30 can be realized with low complexity by using the $L_1$ norm. Therefore, tradeoff between high accuracy and low overhead is resolved.

Please note that, spirit of the process 30 is that a BS uses $L_1$ norm and a modified measurement matrix satisfying the RIP to estimate unknown power information with low distortion and low complexity after receiving power information (e.g. measured power information) from multiple UEs. Detail of realization of the process 30 is not limited.

For example, the macro BS MBS2 processes the received power information y to be unknown power information x multiplied by the measurement matrix $\underline{M}$, y=Mx, wherein y is a vector of a dimension m×1 transmitted by UEs, M is a measurement matrix with a dimension m×n and n>m, and x is a vector of unknown power information (e.g. measured power information) at least one frequency band (e.g. one or more frequency bands) with a dimension n×1 wherein elements of the vector x are unknown to the macro BS MBS2. That is, each UE transmits some elements and the macro BS MBS2 generates the vector y by collecting the elements transmitted by the multiple UEs, wherein time instants of the elements transmitted by the UEs can be slightly different. Preferably, n>>m is satisfied. After receiving the power information, the macro BS MBS2 obtains estimated power information according to the following equations, $$y = \overline{G}z, \text{ wherein } x = Gz, \overline{G} = MG, \quad \text{(Eq. 1)}$$

$$\hat{z} = \arg\min_z \|z\|_1, \text{ s.t. } y = \overline{G}z$$

$$\hat{x} = G\hat{z},$$

wherein $\overline{G}$ is a modified measurement matrix satisfying the RIP with the dimension m×n, G is an amendment matrix with independent and identically distributed (i.i.d) Gaussian elements and a dimension n×n, $\hat{x}$ is a vector of the estimated power information with the dimension n×1, and $\|\ \|_1$ is the $L_1$ norm. Since the measurement matrix M may not satisfy the RIP, the macro BS MBS2 multiplies the measurement matrix M with the amendment matrix G such that the modified measurement matrix $\overline{G}$ satisfies the RIP. Thus, $\hat{z}$ which is a dummy vector can be obtained without nearly no distortion, and the estimated power information $\hat{x}$ can be obtained without nearly no distortion accordingly. Besides, since low complexity algorithm is available for evaluating the $L_1$ norm, the dummy vector $\hat{z}$ can be obtained with low complexity. In short, the estimated power information $\hat{x}$ can be obtained with low distortion (i.e., difference between practical power information and the estimated power information $\hat{x}$ is small), low complexity (i.e., less computations). Therefore, the macro BS MBS2 can construct at least one spectrum map of the at least one frequency band.

Figure 4:
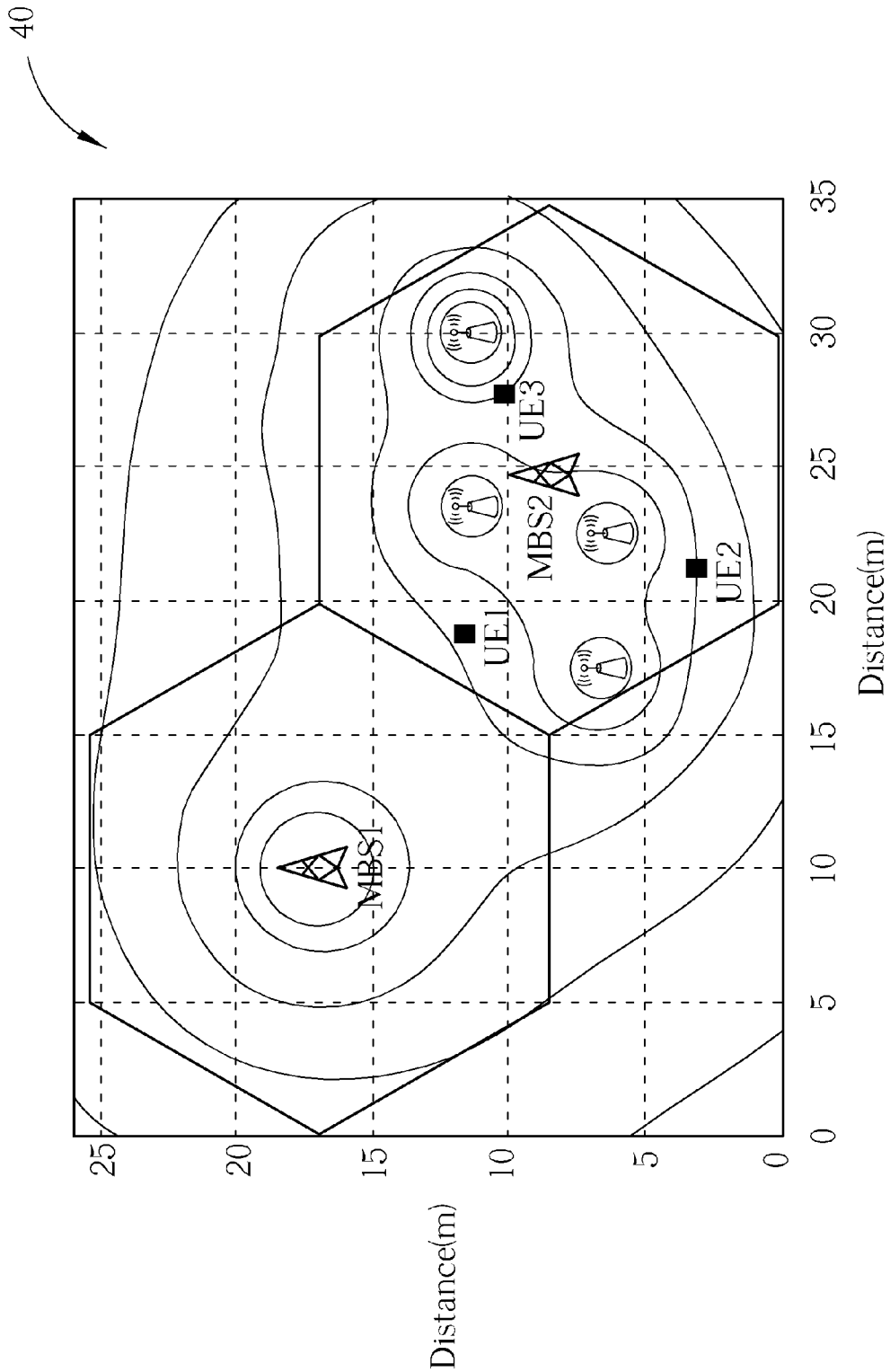
FIG. 4 is a schematic diagram of a contour map of a frequency band according to an example of the present invention.

Please note that, a spectrum map of a frequency band can be plotted or demonstrated in any type of diagrams, such as a histogram or a contour map, and is not limited. For example, please refer to FIG. 4, which is a schematic diagram of a contour map 40 according to an example of the present invention. The contour map 40 is used for illustrating the spectrum map obtained by the macro BS MBS2. In detail, each contour line of the contour map 40 represents an intensity of estimated power information. Dense contour lines represent highly-varied intensity and sparse contour lines represent lowly-varied intensity. For example, the macro BS MBS2 may allocate more radio resources (e.g. resource blocks) to the UEs UE1-UE2 since the UEs UE1-UE2 are at contour lines representing low power intensity (e.g. low usage or low interference). Compositely, the macro BS MBS2 may allocate less radio resources to the UE UE3 since the UE UE3 is at a contour line representing high power intensity (e.g. high usage or high interference). Therefore, the macro BS MBS2 can allocate the radio resources efficiently according to the contour map 40.

Please note that, a method for generating the matrix G is not limited. the macro BS MBS2 can construct the matrix G by generating the i.i.d Gaussian elements or by designing the matrix G according to a certain criterion (e.g. better performance), and is not limited as long as the matrix G is full of the i.i.d Gaussian elements. Besides, the UEs may generate the power information according to an indication generated and transmitted by the macro BS MBS2. For example, the indication may indicate the at least one frequency band at which the power information is obtained or measured. Further, the indication may indicate content included in the power information or when (e.g. at which time instants) to transmit the power information. For example, the power information may be power intensity or other signal strength-related information measured by the UEs. Further, the UEs may directly transmit the power information measured by the UEs. Alternatively, the UE can quantize the power information before transmitting the power information, to reduce radio resources required for transmitting the power information. Besides, the indication may indicate the radio resource used by the UEs for transmitting the power information. On the other hand, the macro BS MBS2 may transmit the indication to the UEs via a broadcasting channel (e.g. broadcast channel (BCH)), a data channel (e.g. physical DL shared channel (PDSCH)) or a control channel (e.g. physical DL control channel PDCCH), and is not limited. The at least one frequency band of which at least one spectrum map is constructed may be entire frequency bands allocated to the UEs, part of the entire frequency bands allocated to the UEs or frequency bands not allocated to the plurality of mobile devices. When the power information at only the parts of the entire frequency bands is measured and reported to the macro BS MBS2 at a time instant, the macro BS MBS2 can indicate the UEs to measure and report the power information at other frequency bands at later time instants. In other words, multiple spectrum maps of multiple frequency bands can be constructed in one time or multiple times according to the present invention.

Figure 5:
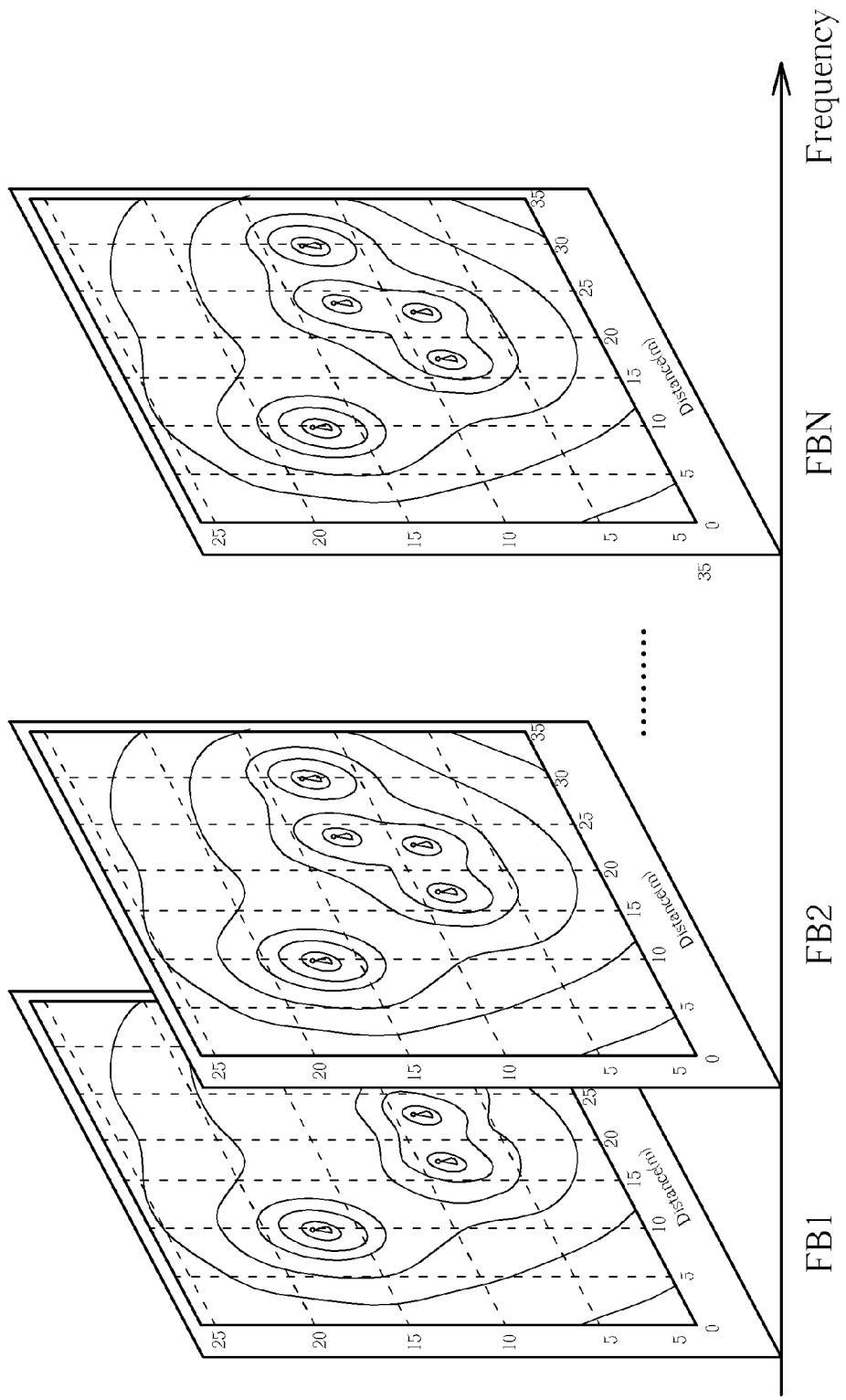
FIG. 5 is a schematic diagram of contour maps of various frequency bands according to an example of the present invention.

On the other hand, the macro BS MBS2 can also construct multiple spectrum maps according to the present invention. Please refer to FIG. 5, which is a schematic diagram of contour maps at various frequency bands FB1-FBN according to an example of the present invention. The contour maps are used for illustrating spectrum maps of the frequency bands FB1-FBN obtained by the macro BS MBS2, respectively. Further, power information required for the spectrum maps may be transmitted by UEs at one time instant, i.e., each UE transmits the power information with N elements, and the macro BS MBS2 receives (or generates) a vector with a large size (i.e., a vector y with a large number of elements) for the frequency bands FB1-FBN. Alternatively, the power information required for the spectrum maps may be transmitted by the UEs at N time instants, i.e., each UE transmits the power information with one element, and the macro BS MBS2 receives (or generates) N vectors with small sizes (i.e., multiple vectors y with small numbers of elements) at N time instants for the frequency bands FB1-FBN, respectively. In other words, the power information (e.g. elements) corresponding to one or multiple frequency bands can be included in a single vector y to be processed by the process 30 (e.g. equation Eq.1). Therefore, the macro BS MBS2 can allocate radio resources (e.g. resource blocks) at the frequency bands FB1-FBN to the UEs (e.g. the UEs UE1-UE3) flexibly according to the contour maps.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method for constructing one or more spectrum maps of by using compressed sensing. Only low complexity is required for constructing the spectrum maps by using $L_1$ norm. Further, accuracy of the spectrum maps is high by using the compressed sensing (i.e. the RIP).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of constructing at least one spectrum map of at least one frequency band for a network of a wireless communication system, the method comprising:

receiving power information, y of a dimension m×1, transmitted by a plurality of mobile devices in the wireless communication system;

processing the received power information y to be a result of unknown power information, x, multiplied by a measurement matrix, M of a dimension m×m and m<n, relating to positions of the plurality of mobile devices;

generating an amendment matrix, G of a dimension n×n, satisfying restricted isometry property (RIP), for processing the measurement matrix M, and obtaining a modified measurement matrix, $\overline{G}$ of a dimension m×n, satisfying the RIP according to the amendment matrix G and the measurement matrix M;

obtaining estimated power information $\hat{x}$ of a dimension n×1, according to the received power information y by using $L_1$ norm and the modified measurement matrix $\overline{G}$; and constructing the at least one spectrum map of the at least one frequency band according to the estimated power information $\hat{x}$;

wherein the estimated power information $\hat{x}$ is an estimation of the unknown power information x, and is obtained according to the following equation:

$$y = Mx = MGz = \overline{G}z, \text{ wherein } x = Gz, \overline{G} = MG,$$

$$\hat{z} = \underset{z}{\operatorname{argmin}} \|z\|_1, \ s.t. y = \overline{G}z,$$

$$\hat{x} = G\hat{z},$$

wherein $\hat{z}$ and z are dummy vectors with a dimension n×1, and $\|\ \|_1$ is the $L_1$ norm.

2. The method of claim 1, wherein the network generates Identically distributed (i.i.d) Gaussian elements for constructing the amendment matrix G.

3. The method of claim 1, wherein the plurality of mobile devices generate the power information y according to an indication generated and transmitted by the network.

4. The method of claim 3, wherein the at least one frequency band is indicated by the indication.

5. The method of claim 3, wherein the plurality of mobile devices transmit the power information y to the network according to the indication.

6. The method of claim 5, wherein the indication indicates resources used by the plurality of mobile devices for transmitting the power information y.

7. The method of claim 5, wherein the indication indicates at least one time instant at which the plurality of mobile devices for transmitting the power information y.

8. The method of claim 3, wherein the network transmits the indication to the plurality of mobile devices via a broadcasting channel, a data channel or a control channel.

9. The method of claim 1, wherein the at least one frequency band is entire frequency bands allocated to the plurality of mobile devices, parts of the entire frequency bands allocated to the plurality of mobile devices or frequency bands not allocated to the plurality of mobile devices.

10. The method of claim 1, wherein the unknown power information x is associated with power intensity.

11. The method of claim 1, wherein the power information y is original power information measured by the plurality of mobile devices, or is quantized power information obtained from the original power information by the plurality of mobile devices.

* * * * *